Figure 1:
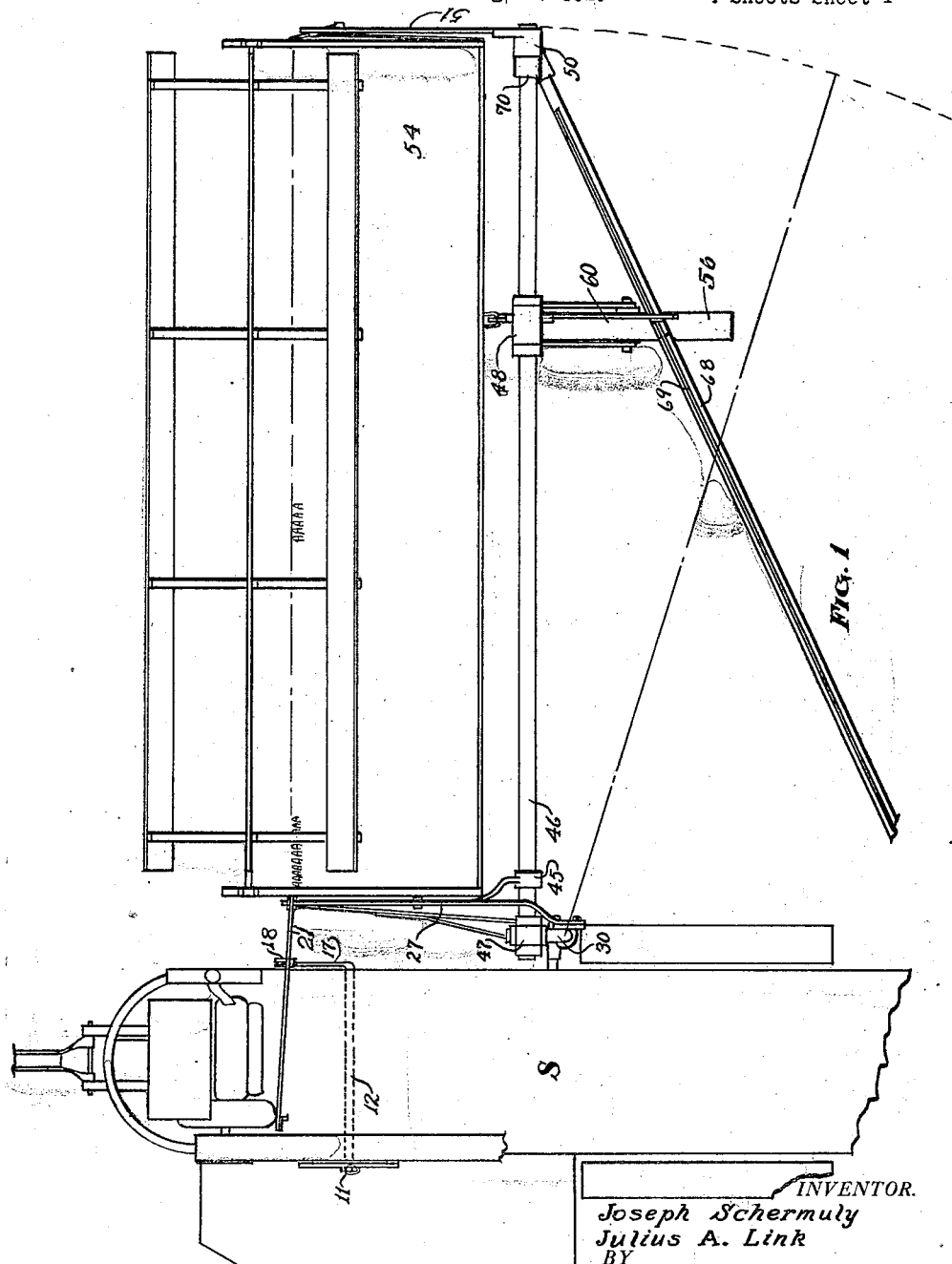

May 20, 1924.

J. SCHERMULY ET AL 1,494,932

COMBINED HEADER AND THRASHING MACHINE

Filed Aug. 1, 1921   4 Sheets-Sheet 1

INVENTOR.
Joseph Schermuly
Julius A. Link
BY

*H. G. Charles*
ATTORNEY.

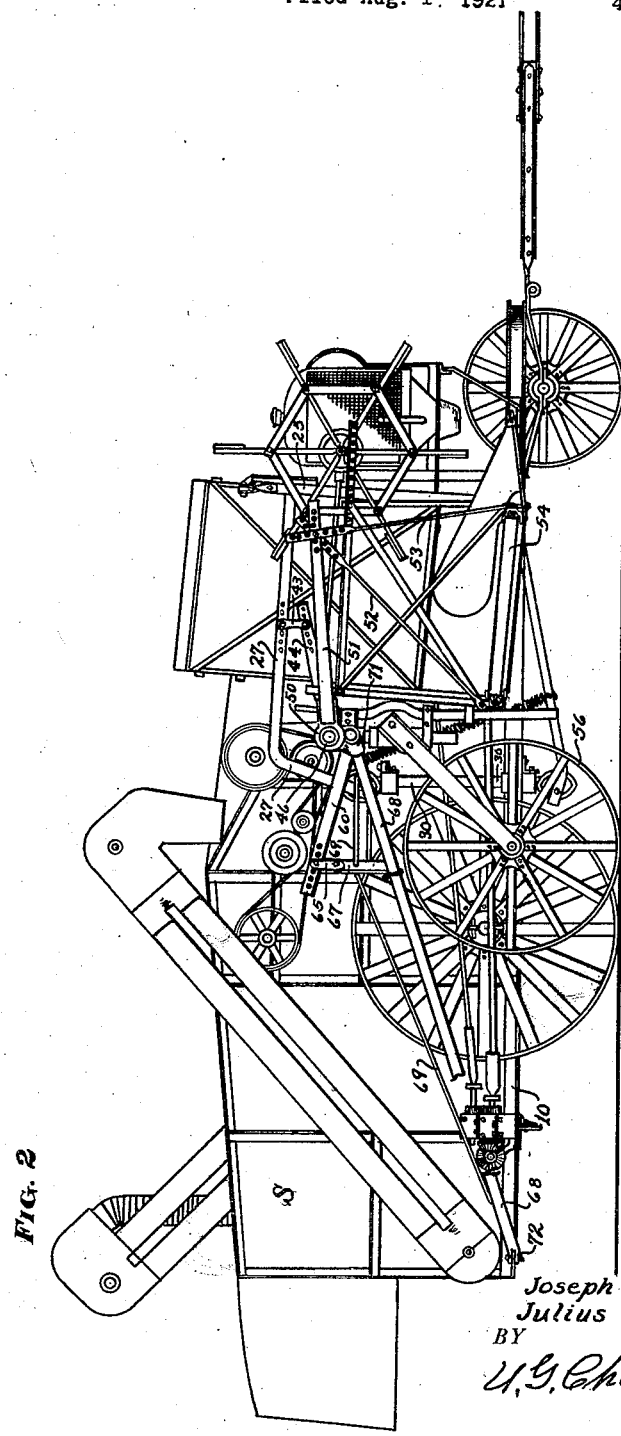

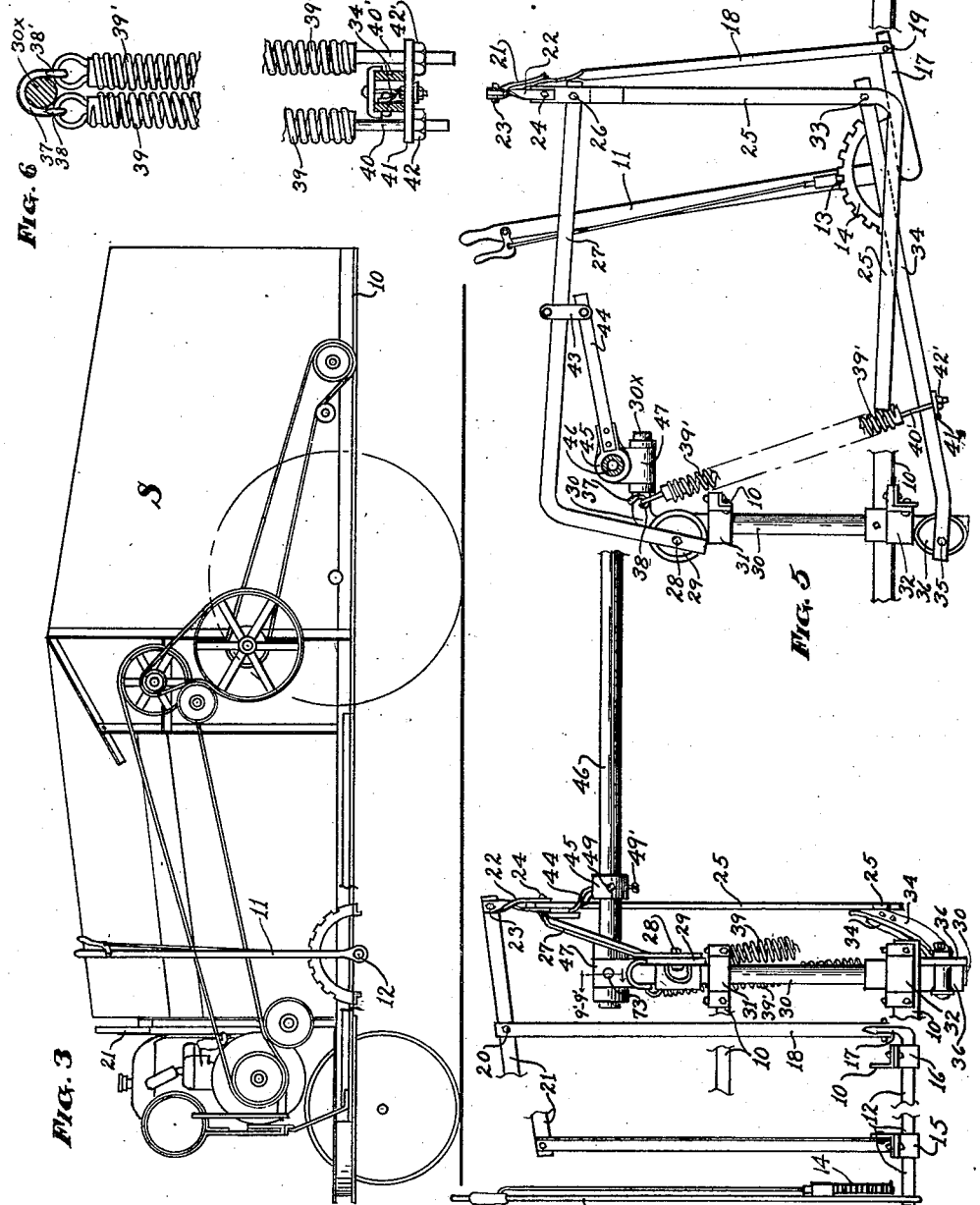

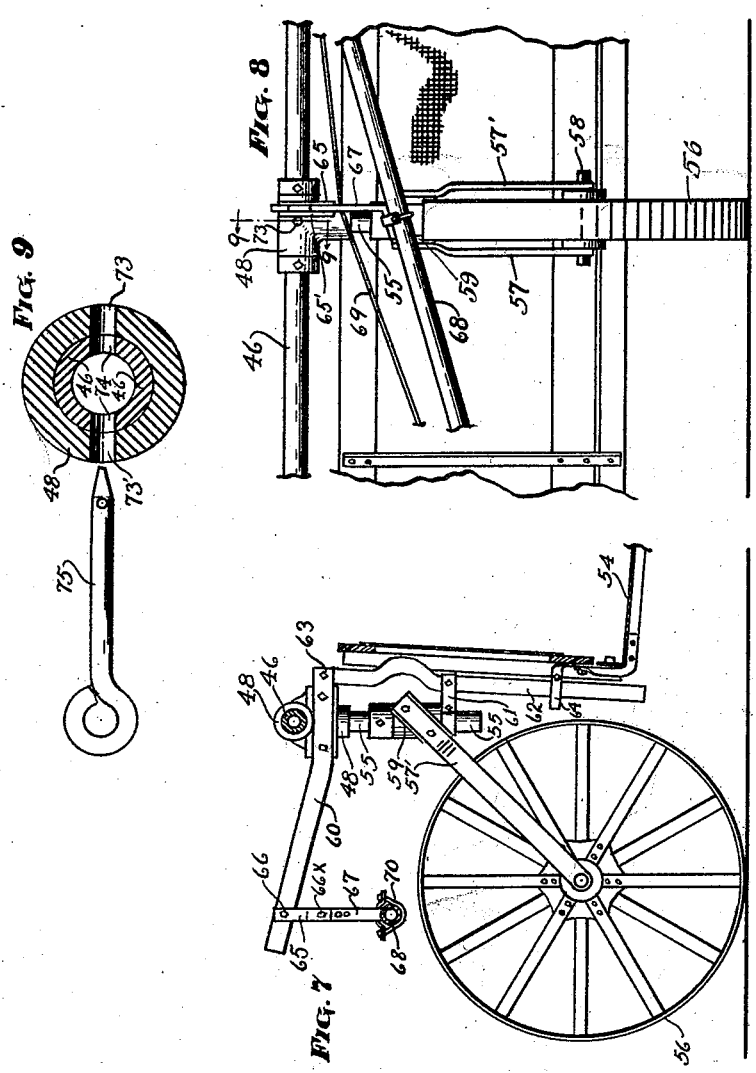

Patented May 20, 1924.

1,494,932

UNITED STATES PATENT OFFICE.

JOSEPH SCHERMULY AND JULIUS A. LINK, OF WICHITA, KANSAS.

COMBINED HEADER AND THRASHING MACHINE.

Application filed August 1, 1921. Serial No. 488,882.

*To all whom it may concern:*

Be it known that we, JOSEPH SCHERMULY and JULIUS A. LINK, citizens of the United States, residing at Wichita, in the county of Sedgwick and State of Kansas, have invented certain new and useful Improvements in a Combined Header and Thrashing Machine, of which the following is a description, referring to the drawings, which accompany this specification.

The invention relates to an improved combination of header mechanism as employed in cutting wheat and other grains and its attachment to and its operation in conjunction with a separator. In our invention the separator is pulled by a tractor or horse power as may be preferred. The header is arranged at the side of the separator upon a pivoted shaft carried by the framework of the separator and by braces and other means later disclosed and the header platform, reel and cutting knives during cutting operations are arranged outwardly at right angles from one side of the separator. When cutting operations are completed and it is desired to travel from one place to another, certain elements in the combination are changed or removed, as later disclosed, and the header platform and allied parts are moved a quarter turn to enable the combined machines to travel on a narrow road. The invention further relates to an improved lever mechanism for handling the load of said system and the weight of the header platform and allied functioning parts, through and in adjustable positions. Further objects of the invention will be disclosed in the description of the drawings in which Fig. 1 is a plan view of the separator and header in operative position for cutting and thrashing grains. Fig. 2 is a right side elevation of the machine seen in Fig. 1. Fig. 3 is a left side elevation of the machine seen in Fig. 1. Fig. 4 is a rear elevation of the lever and its associated parts for supporting and adjusting the header platform. Fig. 5 is a side view of the mechanism shown in Fig. 4. Fig. 6 is a detail of the tension springs as employed in the lever mechanism shown in Figs. 1, 2, 4 and 5. Fig. 7 is a side elevation of the caster wheel and its supporting connections to the header platform. Fig. 8 is a rear view of Fig. 7. Fig. 9 is a sectional view taken on the line 9—9, Fig. 8 and on the line 9'—9' of Fig. 4. Similar numerals of reference indicate corresponding parts throughout the several figures of the drawings.

Referring to the drawings, S represents the separator of an approved design having a framework preferably of angle iron 10. Mounted near the front of the separator is a shaft 12 and secured to the shaft to turn therewith is a lever 11 having a pawl 13 for engagement with a segment 14 to hold the lever in its various positions of adjustment. The shaft 12 turns in the boxings 15, 16 of the frame 10 when actuated by the lever 11; thus raising or lowering the arm 17 rigid with the shaft 12.

A rod 18 is pivotally connected at 19 to the arm 17 and at 20 to the rod 21. At the outer end of the rod 21, a twisted link 22 is pivotally attached as at 23; the other end of the link 22 being connected at 24 to an arm 25, the lower portion of which is curved into a horizontal portion (see Fig. 5) and carries the inner end of the header platform.

At 26, the arm 27 is pivotally connected to the arm 25. This arm 27 at its inner end is bent downwardly and is pivotally attached at 28 to the casting 29 which is rigidly attached to the upright shaft 30. The shaft 30 is rotatably mounted in boxings 31, 32 on portions 10 of the separator framework. Just above the horizontal portion of the arm 25 is pivotally connected at 33, the arm 34. This arm 34 is also pivoted at 35 to a casting 36 which is rigid with the shaft 30. The upper portion of the shaft 30 is bent downwardly and forms a gooseneck $30^x$ and over this portion of the shaft 30 is hung a yoke 37 which is provided with end hooks 38, 38'. These hooks carry the upper ends of tension springs 39, 39'. The bolts 40, 40' engage the lower ends of the springs 39, 39' as disclosed and pass through holes in the plate 41, being secured by the nuts 42, 42'. The arm 34 is attached to and supported upon the plate 41. It will be noted that the springs 39, 39' thus carry the load of the whole leverage mechanism as well as the weight of the header supported upon the arm 25.

The shackle 43 carried from the arm 27 is connected to the arm 44 which is rigidly attached to the casting 45. A horizontal pipe or shaft 46 is mounted to turn in bearings 47, 48. The bearing 47 is a casting mounted upon the gooseneck $30^x$. The casting 45 is rigidly attached to the pipe 46 by set screws 49, 49'. When the arm 44 is moved up or down by the action of the arm 27, the shaft 46 is turned in its bearings 47 and 48.

Rigidly attached to the outer end of the shaft 46 is a casting 50 carrying the arm 51. The arm 51 is connected to the rods 52 and 53 which support the outer end of the header platform 54. It will be noted that both ends of the header platform 54 are adjustable in parallelism and in unison.

The spindle 55 of the castor wheel 56 is secured to the casting 48 and the arms 57, 57' connect the axle 58 of the wheel 56 and the housing 59 sleeved on the spindle 55. Thus the header platform is supported by the castor wheel 56 at the outer end and by the shaft 30 at the end adjacent the separator. The header is braced in the position previously described and as shown in Figs. 1 and 2, as follows. The arm 60 is rigid with the casting 48. A loop and arm 61 engages the lower portion of the spindle 55 and is pivotally connected to the arm 62 which is pivotally connected with the arm 60 at 63. This arm 62 passes through a yoke 64 attached to the outer portion of the header platform 54. The shackles 65, 65' are pivotally pinned at 66 to the arm 60 and pivotally connected at 66ˣ to the standard 67. A brace member 68 trussed by the rod 69 is secured rigidly to the standard 67 by means of the yoke and U-bolt 70, Fig. 7. The upper and outer end of the brace 68 engages the casting 71 which is movable on the shaft 46; a set screw may be used for locking the brace 68 to the casting 71. The lower end of the brace 68 is bolted to the frame 10 of the separator at 72.

One of the main objects of the invention is to reduce the width of the combined machine for road travel or for parking purposes. This is accomplished by moving the header element, rearwardly, the shaft 30 pivoting in the boxings 31 and 32. The dotted arc, Fig. 1 shows the arc movement of the outer end of the header platform for the above purpose. Before moving the header platform, the shaft 46 is adjusted as disclosed in Fig. 9: the holes 73 in the castings 47 and 48 register with the holes 74 in the shaft 46. A pin 75 is passed through the registering holes 73 and 74 of both castings. The shaft 46 is thus made rigid with the castings 47 and 48. The pin at 23 is next removed. After removing the pin 66, the brace 68 is disconnected. If the separator is now pulled ahead, the caster wheel, supporting the outer end of the header, will lag behind and the header mechanism swing backward into a position alongside of the separator. This reduces the width of the combined machine for the purposes mentioned above.

Such modifications may be employed as lie within the scope of the appended claims. Having fully described our invention what we now claim as new and desire to secure by Letters Patent is:

1. In combination, a separator, a vertical shaft turnably arranged upon one side of the separator, a caster wheel, a header and a header platform supported by said shaft and caster wheel; a lever, locking means therefor, a shaft terminating in a crank mounted in bearings on the separator and a rod 18 pivotally supported on said crank; a horizontal shaft mounted at one end on parts carried by the vertical shaft and at another point in bearings supported by a caster wheel of the header; a plurality of rods pivotally connected to the rod 18 and to portions on the vertical shaft, one of said rods supporting the inner end of the header platform and another of said rods acting through pivoting shackles and a connecting rod rigid with the horizontal shaft for occasioning desired movements to said horizontal shaft during lever manipulations.

2. In combination, a separator, a vertical shaft turnably arranged upon one side of the separator, a caster wheel, a header and a header platform supported by said shaft and caster wheel; a lever, locking means therefor, a shaft terminating in a crank mounted in bearings on the separator and a rod 18 pivotally supported on said crank; a horizontal shaft mounted at one end on parts carried by the vertical shaft and at another point in bearings supported by a caster wheel of the header; a plurality of rods pivotally connected to the rod 18 and to portions on the vertical shaft, one of said rods supporting the inner end of the header platform and another of said rods acting through pivoting shackles and a connecting rod rigid with the horizontal shaft for occasioning desired movements to said horizontal shaft during lever manipulations; and an attachable and detachable brace member connected to the separator and outer portions of said header for the purposes disclosed.

3. In combination a header, a caster wheel, a lever, locking means therefor, a shaft turnably mounted in bearings supported by a separator allied with said header and carrying a crank rigid therewith, a rod 18 supported by said crank; a horizontal shaft revolvable in bearings on the header and supported by a caster wheel thereof; a header platform a plurality of rods pivotally connected to said rod 18 and to a supporting member of said header, one of said rods supporting the inner end of the header platform and another of said rods uniting with a connecting rod rigid with the horizontal shaft; an outer arm rigid with the horizontal shaft and rods united therewith supporting the outer end of the header platform, and whereby lever movements occasion through said train of coacting elements, a movement of said header platform throughout its length, for the specified purposes.

4. In combination, a separator, a vertical shaft turnably arranged upon one side of the separator, a caster wheel, a header and a header platform supported by said shaft and caster wheel; a lever, locking means therefor, a shaft terminating in a crank mounted in bearings on the separator and a rod 18 pivotally supported on said crank; a horizontal shaft mounted at one end on parts carried by the vertical shaft and at another point in bearing supported by a caster wheel of the header; a plurality of rods pivotally connected to the rod 18 and to portions on the vertical shaft, one of said rods supporting the inner end of the header platform and another of said rods acting through pivoted shackles and a connecting rod rigid with the horizontal shaft for occasioning desired movements to said horizontal shaft during lever manipulations; an outer arm rigid with the horizontal shaft and rods united therewith for supporting the outer end of the header platform and whereby said lever movements occasion through said train of coacting elements a movement of the header platform throughout its length for the purposes as specified.

5. In combination, a separator, a vertical shaft turnably arranged upon one side of the separator, a caster wheel, a header and a header platform adapted to turn with said shaft and supported thereby; a brace member detachably connected to said header and separator for preventing swinging movement of said header when attached; a lever, locking means therefor, a shaft terminating in a crank mounted in bearings on the separator and a rod 18 pivotally supported from said crank; a horizontal shaft mounted at one end on parts carried by the vertical shaft and at another point in bearings supported by the caster wheel of the header; a plurality of rods pivotally connected to the rod 18 and to portions on the vertical shaft, one of said rods supporting the inner end of the header platform and another of said rods acting through pivoted shackles and a connecting rod rigid with the horizontal shaft for occasioning desired movements to said horizontal shaft during lever manipulations; an outer arm rigid with the horizontal shaft and rods united therewith for supporting the outer end of the header platform and whereby said lever movements occasion through said train of coacting elements, a movement of the header platform throughout its length for the purposes as specified.

JOSEPH SCHERMULY.
JULIUS A. LINK.

Witnesses:
M. Y. CHARLES,
W. A. NETHENOT.